(12) United States Patent
Kobayashi et al.

(10) Patent No.: US 10,541,762 B1
(45) Date of Patent: Jan. 21, 2020

(54) ANGULAR ERROR DETECTING DEVICE

(71) Applicant: NIHON DEMPA KOGYO CO., LTD., Tokyo (JP)

(72) Inventors: Kaoru Kobayashi, Saitama (JP); Naoki Onishi, Saitama (JP)

(73) Assignee: NIHON DEMPA KOGYO CO., LTD., Tokyo (JP)

( * ) Notice: Subject to any disclaimer, the term of this patent is extended or adjusted under 35 U.S.C. 154(b) by 0 days.

(21) Appl. No.: 16/522,616

(22) Filed: Jul. 25, 2019

(30) Foreign Application Priority Data

Jul. 26, 2018 (JP) ................................. 2018-140009

(51) Int. Cl.
  H04B 17/00 (2015.01)
  H04B 17/21 (2015.01)
  H04B 17/27 (2015.01)

(52) U.S. Cl.
  CPC ............. *H04B 17/21* (2015.01); *H04B 17/27* (2015.01)

(58) Field of Classification Search
  CPC ................................ H04B 17/21; H04B 17/27
  USPC ...................................................... 455/67.16
  See application file for complete search history.

(56) References Cited

U.S. PATENT DOCUMENTS

| | | | | |
|---|---|---|---|---|
| 3,757,336 A * | 9/1973 | Rosen | ...................... | G01S 3/325 342/354 |
| 4,752,884 A * | 6/1988 | Slafer | ...................... | B64G 1/24 701/13 |
| 7,227,912 B2 * | 6/2007 | Kasperkovitz | ......... | H03D 3/009 375/316 |
| 8,896,483 B2 * | 11/2014 | Markin | ...................... | G01S 3/08 342/149 |
| 9,154,148 B2 * | 10/2015 | Schafferer | ............... | H03M 1/06 |
| 9,184,961 B2 * | 11/2015 | Kroeger | ................ | H04L 27/156 |
| 2012/0007769 A1 * | 1/2012 | Markin | ..................... | G01S 3/043 342/153 |
| 2012/0013500 A1 * | 1/2012 | Markin | ..................... | G01S 3/08 342/149 |
| 2012/0139532 A1 * | 6/2012 | Ueda | .................... | G01D 5/2448 324/207.22 |
| 2017/0314975 A1 * | 11/2017 | Mochizuki | ............. | G01D 5/145 |
| 2018/0019835 A1 * | 1/2018 | Kamiya | ................ | H04L 1/0048 |
| 2018/0022386 A1 * | 1/2018 | Watanabe | .............. | B62D 5/049 702/151 |

FOREIGN PATENT DOCUMENTS

JP   S56500394   3/1981
JP   2010066069  3/2010

\* cited by examiner

*Primary Examiner* — April G Gonzales
(74) *Attorney, Agent, or Firm* — JCIPRNET

(57) ABSTRACT

An angular error detecting device detects an angular error in a receiving direction of a frequency signal from a tracking target with respect to a front direction of an antenna based on a phase difference of a first reception signal received at a first receiving unit of the antenna and a second reception signal received at a second receiving unit having a receiving position in the antenna different from a receiving position of the first receiving unit. The angular error detecting device includes a reception signal output unit, a pilot signal supply unit, a pilot phase difference detection unit, a correction unit, and an angular error detection unit. The angular error detection unit detects the angular error based on the one side corrected at the correction unit and the other side that is not corrected of the sum signal and the difference signal.

6 Claims, 9 Drawing Sheets

ANGULAR ERROR DETECTING DEVICE

CROSS-REFERENCE TO RELATED APPLICATIONS

This application claims the priority benefits of Japanese Patent Application No. 2018-140009, filed on Jul. 26, 2018. The entirety of the above-mentioned patent application is hereby incorporated by reference herein and made a part of this specification.

TECHNICAL FIELD

This disclosure relates to a technique that detects an angular error of an antenna with respect to a tracking target.

DESCRIPTION OF THE RELATED ART

A receiving system that receives a communication signal as a frequency signal output from a tracking target such as a communication satellite includes one (a tracking receiving system) configured to change a direction of an antenna such that a receiving direction of the communication signal is aligned with a front direction of the antenna, based on a result of detection of a deviation (an angular error) of the receiving direction of the communication signal with respect to the front direction of the antenna.

As a detecting method of the angular error, a monopulse angle-measuring method that obtains an amplitude difference in respective communication signals received at two opening portions (a first receiving unit and a second receiving unit), which are provided in the antenna and have different locations, to obtain the angular error based on this amplitude difference has been known.

In this monopulse angle-measuring method, a calculation to obtain the angular error is performed using a sum signal A+B and a difference signal A−B of a communication signal A received at the first receiving unit and a communication signal B received at the second receiving unit.

On the other hand, in the tracking receiving system, a calculating machine that calculates the angular error is not necessarily able to be arranged at a position near the antenna. For example, there is a case where these antennas and calculating machine are forced to be arranged at positions apart from one another by a few tens of meters to a few hundred meters.

In this case, a sum signal and a difference signal obtained on the antenna side are supplied to the calculating machine side via signal paths (a sum-signal signal path and a difference-signal signal path) including communication cables and the like.

However, when lengths of these signal paths are not strictly aligned, a phase difference between the sum signal and the difference signal is formed to become a factor that blocks an accurate calculation of the angular error. For example, a difference in degrees of deterioration of the communication cables and a difference in temperature in spaces where the communication cables are arranged become a factor that forms the phase difference between the sum signal and the difference signal.

Here, Japanese Unexamined Patent Application Publication No. 56-500394 (claims 1 and 8, column 4, line 20 to column 6, line 4, and FIG. 1) and Japanese Unexamined Patent Application Publication No. 2010-66069 (claims 1 and 5, and Paragraphs 0024 to 0033) disclose a technique that supplies respective signal paths (disclosed as "receiving channel" in Japanese Unexamined Patent Application Publication No. 56-500394, and disclosed as "system" in Japanese Unexamined Patent Application Publication No. 2010-66069) to which the sum signal and the difference signal are transmitted with pilot signals switched from these sum signal and difference signal to correct the sum signal and the difference signal based on a result of detection of a phase difference in the pilot signals that have passed through the different signal paths.

However, Japanese Unexamined Patent Application Publication No. 56-500394 and Japanese Unexamined Patent Application Publication No. 2010-66069 do not disclose a technique that detects the phase difference caused by the respective signal paths in real time without performing the switching between the sum signal/the difference signal and the pilot signals to utilize it for the correction.

A need thus exists for an angular error detecting device which is not susceptible to the drawback mentioned above.

SUMMARY

According to an aspect of this disclosure, there is provided an angular error detecting device. The angular error detecting device detects an angular error in a receiving direction of a frequency signal from a tracking target with respect to a front direction of an antenna based on a phase difference of a first reception signal received at a first receiving unit of the antenna and a second reception signal received at a second receiving unit having a receiving position in the antenna different from a receiving position of the first receiving unit. The angular error detecting device includes a reception signal output unit, a pilot signal supply unit, a pilot phase difference detection unit, a correction unit, and an angular error detection unit. The reception signal output unit outputs a sum signal and a difference signal that are obtained from the first reception signal and the second reception signal to a sum-signal signal path and a difference-signal signal path respectively. The pilot signal supply unit superimposes respective pilot signals having aligned phases on the sum signal and the difference signal that are output to the sum-signal signal path and the difference-signal signal path. The pilot phase difference detection unit separates the respective pilot signals from a signal that has passed through the sum-signal signal path and a signal that has passed through the difference-signal signal path and detects a phase difference in the separated pilot signals. The correction unit performs a correction corresponding to the phase difference in the pilot signals detected at the pilot phase difference detection unit on one side of the sum signal and the difference signal that are obtained via the sum-signal signal path and the difference-signal signal path. The angular error detection unit detects the angular error based on the one side corrected at the correction unit and the other side that is not corrected of the sum signal and the difference signal.

BRIEF DESCRIPTION OF THE DRAWINGS

The foregoing and additional features and characteristics of this disclosure will become more apparent from the following detailed description considered with reference to the accompanying drawings.

DESCRIPTION OF EMBODIMENTS

Figure 1:
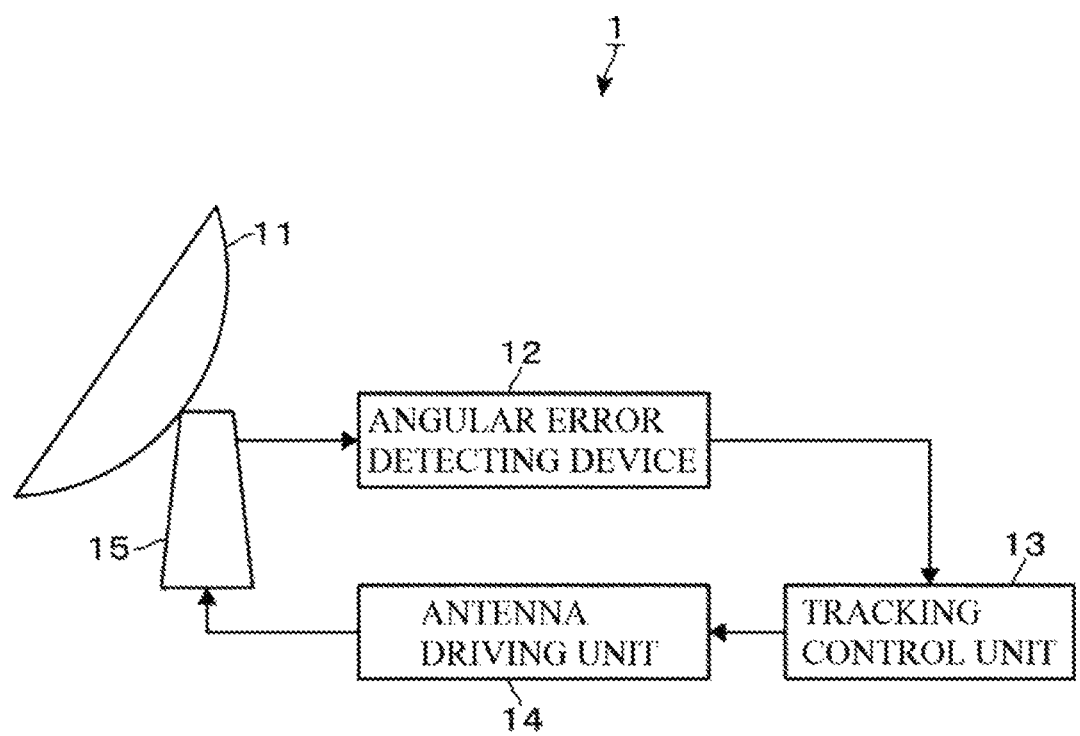
FIG. 1 is a configuration diagram of a tracking receiving system that includes an angular error detecting device according to an embodiment.

FIG. 1 illustrates an exemplary configuration of a tracking receiving system 1 that includes an angular error detecting device according to an embodiment of this disclosure.

This tracking receiving system 1 includes an antenna 11, an antenna driving mechanism 15, an angular error detecting device 12, a tracking control unit 13, and an antenna driving unit 14. The antenna 11 receives a communication signal (a frequency signal) output from a tracking target. The antenna driving mechanism 15 changes a direction of this antenna 11. The angular error detecting device 12 detects a deviation (an angular error) in a receiving direction of the communication signal with respect to a front direction of the antenna 11, based on a sum signal and a difference signal of the communication signal obtained from the antenna 11. The tracking control unit 13 obtains a driving direction and a driving amount of the antenna 11 based on the angular error detected at the angular error detecting device 12. The antenna driving unit 14 performs drive control on the antenna driving mechanism 15, based on the driving direction and the driving amount determined at the tracking control unit 13.

Figure 2:
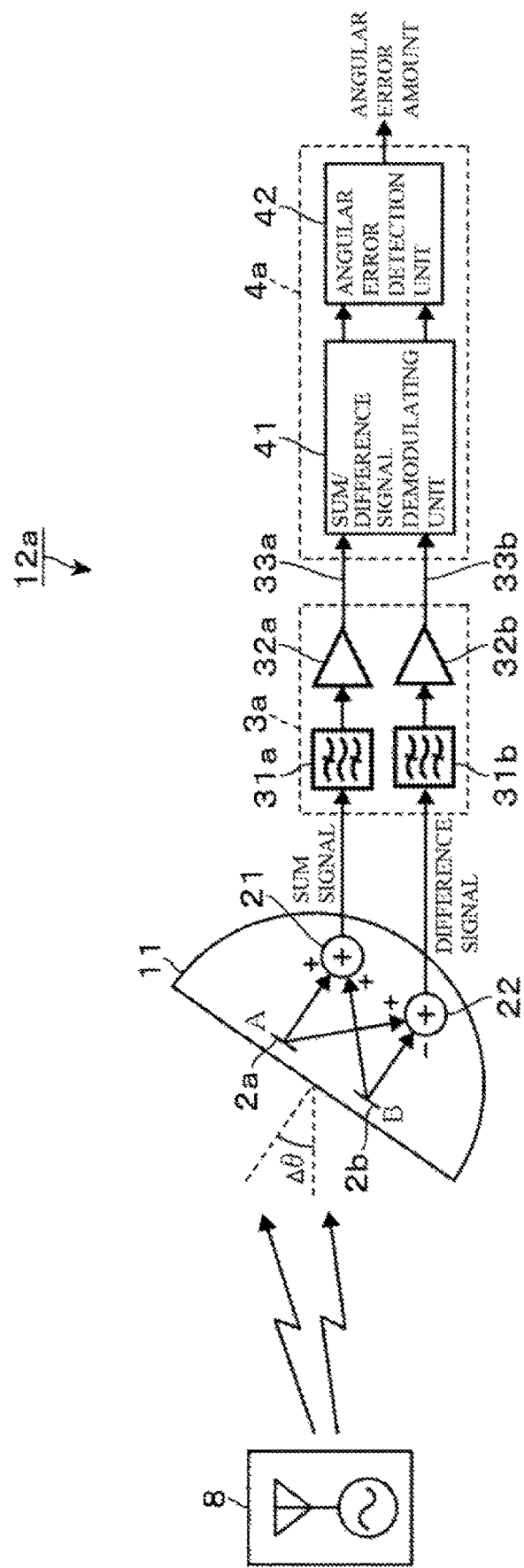
FIG. 2 is a block diagram illustrating an exemplary configuration of an angular error detecting device according to a comparative configuration.

FIG. 2 illustrates an exemplary configuration of an angular error detecting device 12a according to a comparative configuration before this disclosure is applied. The applicant could not find a related art corresponding to the angular error detecting device 12a illustrated in FIG. 2. Therefore, treating the angular error detecting device 12a described in FIG. 2 as "the comparative configuration" does not mean that the applicant confesses that this technique is the related art.

For example, a tracking target 8 illustrated in FIG. 2 outputs a communication signal having a frequency that varies in a preliminarily set frequency range. This communication signal contains a baseband signal modulated by a carrier wave having a frequency in the frequency range, and a pulse signal.

The antenna 11 includes a first receiving unit 2a and a second receiving unit 2b having different receiving positions one another. When angle-measuring in an orientation direction is performed, the first receiving unit 2a and the second receiving unit 2b are arranged at positions different in a lateral direction. When angle-measuring in a height direction is performed, the first receiving unit 2a and the second receiving unit 2b are arranged at positions different in the height direction.

Respective communication signals A and B received at these first and second receiving units 2a and 2b are output as a sum signal A+B and a difference signal A−B, for example, through addition units 21 and 22 disposed on a side of the antenna 11.

Figure 5:
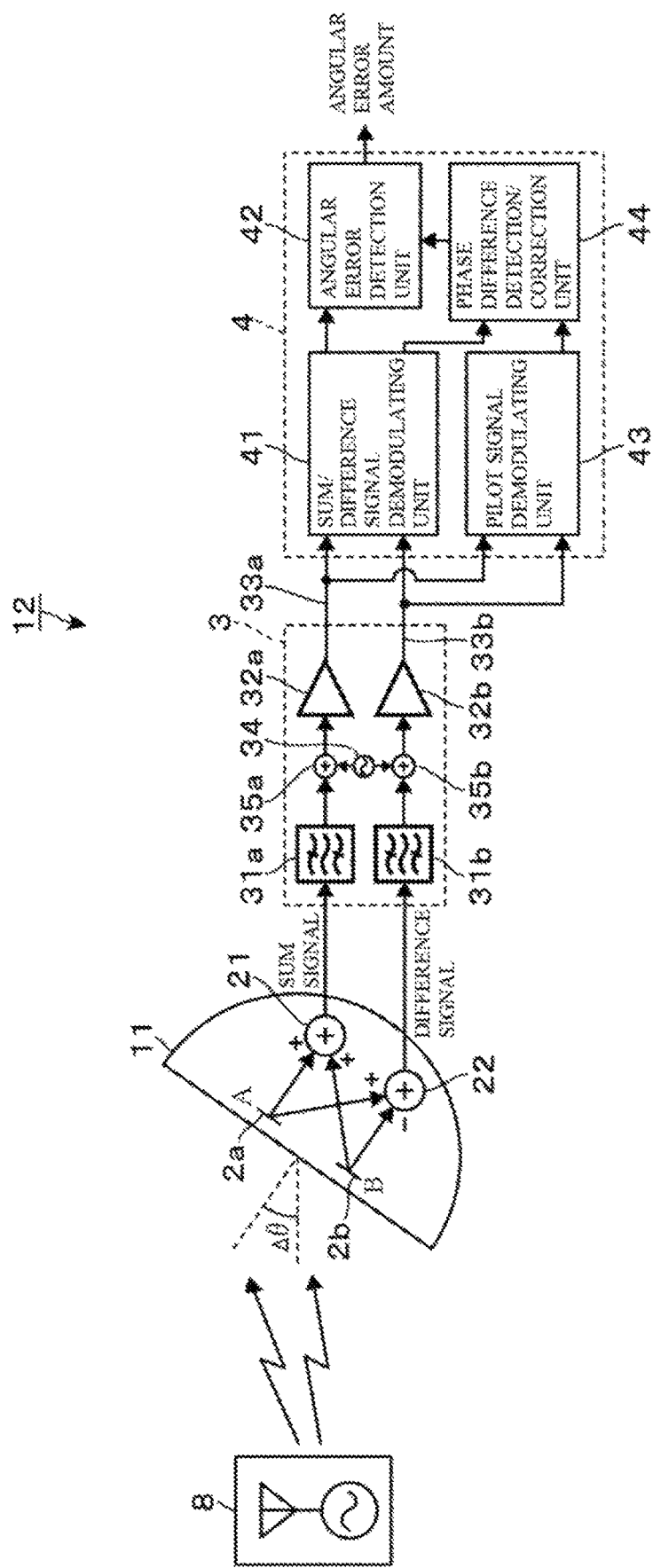
FIG. 5 is a block diagram illustrating an exemplary configuration of the angular error detecting device according to the embodiment.

In examples illustrated in FIG. 2 and FIG. 5, a case where the sum signal and the difference signal are obtained on the antenna 11 side is described, but the addition units 21 and 22 that obtain these signals may be disposed on a side of the angular error detecting devices 12a and 12.

The angular error detecting device 12a includes a reception signal output unit 3a and a signal processing block 4a. The reception signal output unit 3a includes receiving filters 31a and 31b that filter unnecessary components and Automatic Gain Controllers (AGCs) 32a and 32b that amplify the sum signal and the difference signal after the filtering. The signal processing block 4a includes an angular error detection unit 42 that detects the angular error.

A sum-signal signal path 33a through which the sum signal passes and a difference-signal signal path 33b through which the difference signal passes connect the reception signal output unit 3a to the signal processing block 4a.

The signal processing block 4a illustrated in FIG. 2 includes a sum/difference signal demodulating unit 41 and the angular error detection unit 42. The sum/difference signal demodulating unit 41 performs quadrature demodulation on the sum signal and the difference signal. The angular error detection unit 42 obtains an angular error $\Delta\theta$ based on a result of the demodulation of these sum signal and difference signal.

Figure 3:
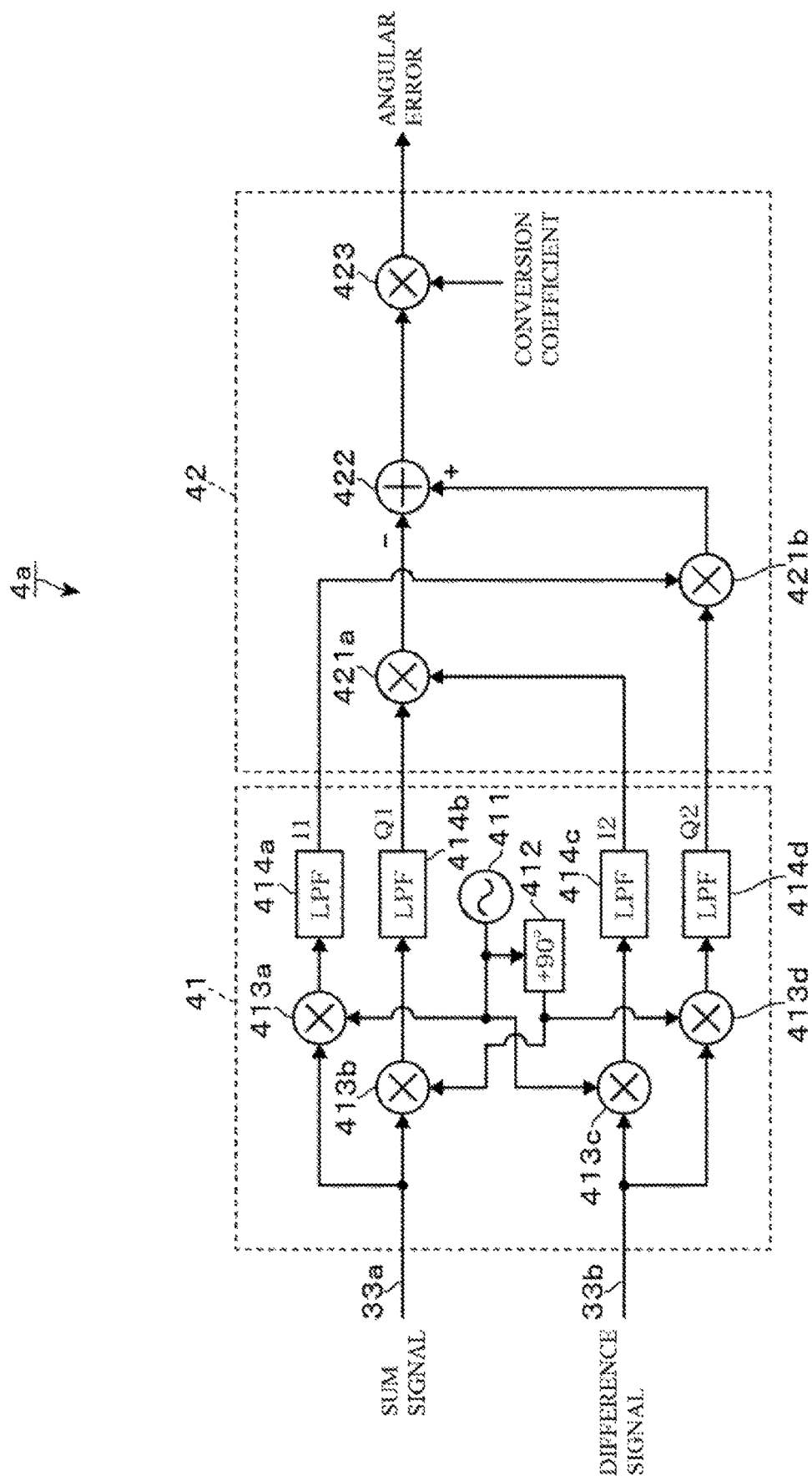
FIG. 3 is an explanatory drawing illustrating a configuration of a signal processing block in the angular error detecting device according to the comparative configuration.

FIG. 3 illustrates an exemplary specific configuration of the sum/difference signal demodulating unit 41 and the angular error detection unit 42 disposed on the signal processing block 4a. Before the configuration in FIG. 3 will be described, a method to obtain the angular error using this signal processing block 4a will be described by referring to FIG. 4.

Figure 4:
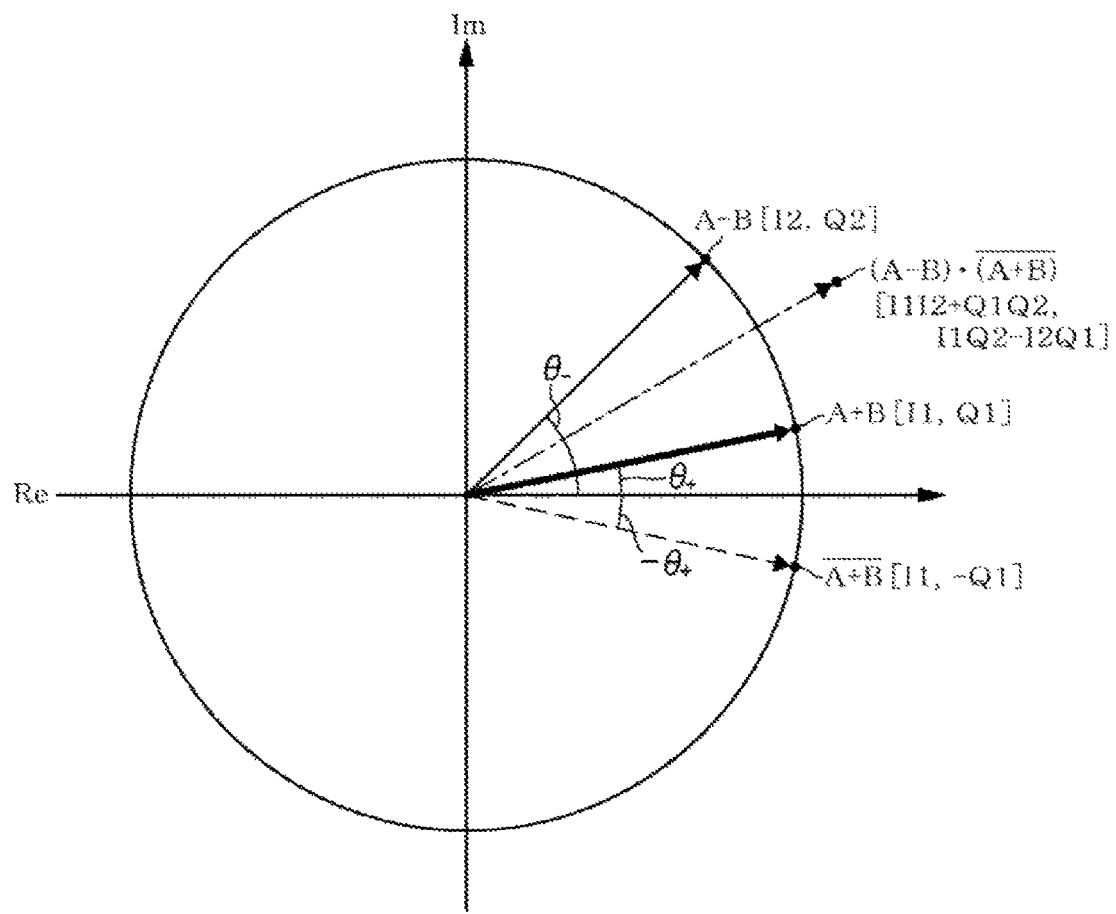
FIG. 4 is an explanatory drawing according to a method to obtain an angular error.

FIG. 4 illustrates a complex plane. A thick solid-line vector A+B indicates a result obtained such that the quadrature demodulation is performed on the sum signal obtained via the sum-signal signal path 33a and complex vector representation is performed taking its I (In-phase) component as a real part and its Q (Quadrature-phase) component as an imaginary part on the complex plane. A thin solid-line vector A−B indicates a result obtained such that the quadrature demodulation is performed on the difference signal obtained via the difference-signal signal path 33b and the complex vector representation is similarly performed taking the I component as the real part and the Q component as the imaginary part.

When an argument of the complex vector A+B is defined as $\theta_+$ and an argument of the complex vector A−B is defined as $\theta_-$, the angular error $\Delta\theta$ of the antenna 11 can be identified by obtaining a difference value $\Delta\theta$ ($=\theta_- - \theta_+$) of these arguments.

Here, the following inner product of the complex vectors A+B and A−B is expressed by the following Formula (1), and an argument of a complex vector (a sum/difference signal inner-product vector) obtained by this inner product is expressed by the Formula (2).

[Formula (1)]

$$(A-B) \cdot \overline{(A+B)}$$

$$= (I2+jQ2) \cdot (I1-jQ1)$$

$$= (I1 I2 + Q1 Q2) + j(I1 Q2 - I2 Q1) \quad (1)$$

[Formula (2)]

$$\arg\{(A-B)\cdot\overline{(A+B)}\}$$

$$=\arg(A-B)+\arg\overline{(A+B)}$$

$$\arg(A-B)-\arg(A+B)$$

$$=\theta_- - \theta_+ = \Delta\theta \quad (2)$$

Then, when θ is sufficiently small and sinθ≈θ, a relationship of Δθ ∝(I1Q2−I2Q1) is satisfied with the imaginary part in the Formula (1).

The sum/difference signal demodulating unit 41 in FIG. 3 includes a frequency oscillating unit 411 and a phase rotator 412. The frequency oscillating unit 411 outputs a frequency signal (for example, cosine wave) corresponding to a frequency of the carrier wave. The phase rotator 412 obtains a frequency signal (for example, sine wave) obtained such that a phase of the frequency signal corresponding to the frequency of the carrier wave is advanced by 90°.

A multiplier 413*a* multiplies the sum signal obtained via the sum-signal signal path 33*a* by the frequency signal from the frequency oscillating unit 411, thus taking out an I component (I1) by removing unnecessary components at a low-pass filter (LPF) 414*a*. A multiplier 413*b* multiplies the sum signal by the frequency signal obtained such that the phase is advanced by 90° at the phase rotator 412, thus taking out a Q component (Q1) by removing unnecessary components at an LPF 414*b*.

Similarly, a multiplier 413*c* multiplies the difference signal obtained via the difference-signal signal path 33*b* by the frequency signal from the frequency oscillating unit 411, thus taking out an I component (I2) by removing unnecessary components at an LPF 414*c*. A multiplier 413*d* multiplies the difference signal by the frequency signal obtained such that the phase is advanced by 90° at the phase rotator 412, thus taking out a Q component (Q2) by removing unnecessary components at an LPF 414*d*.

The angular error detection unit 42, using I1 and Q1 of the sum signal and I2 and Q2 of the difference signal, obtains "I1Q2−I2Q1" as a value of the imaginary part in the Formula (1) based on the way of thinking described using FIG. 4. That is, a difference value between "I1Q2" obtained at a multiplier 421*b* and "I2Q1" obtained at a multiplier 421*a* is output from an adder 422.

Then, when this difference value is multiplied by a preliminarily set conversion coefficient, which converts this difference value into an actual angular error, at a coefficient multiplier 423, the angular error as a deviation amount in the receiving direction of the communication signal with respect to the front direction of the antenna 11 can be obtained.

As described above, the angular error detecting device 12*a* (the signal processing block 4*a*) described using FIG. 2 and FIG. 3 can obtain an exact angular error when a phase relationship between the sum signal and the difference signal obtained via the sum-signal signal path 33*a* and the difference-signal signal path 33*b* is maintaining a state identical to that of a phase relationship between the sum signal and the difference signal output from the reception signal output unit 3*a*.

In other words, when the deviation in the phases of the sum signal and the difference signal occurs during the passage through these signal paths 33*a* and 33*b*, the exact angular error possibly cannot be obtained.

In this respect, as described above, these signal paths 33*a* and 33*b* include the communication cables having lengths of, for example, a few tens of meters to a few hundred meters. In the case where the lengths of both the communication cables are not strictly aligned or degrees of deterioration or temperatures in arranged environment of both the communication cables are different, the deviation in the phases may occur when the sum signal and the difference signal pass through these signal paths 33*a* and 33*b*.

Therefore, the angular error detecting device 12 in this example has a function that superimposes pilot signals on the sum signal and the difference signal before being output toward the sum-signal signal path 33*a* and the difference-signal signal path 33*b*, compares phase differences in the pilot signals taken out from the sum-signal signal path 33*a* and the difference-signal signal path 33*b*, and then, corrects one side (the difference signal in the example illustrated in FIG. 7) of the sum signal and the difference signal using the detected phase difference.

Figure 6:
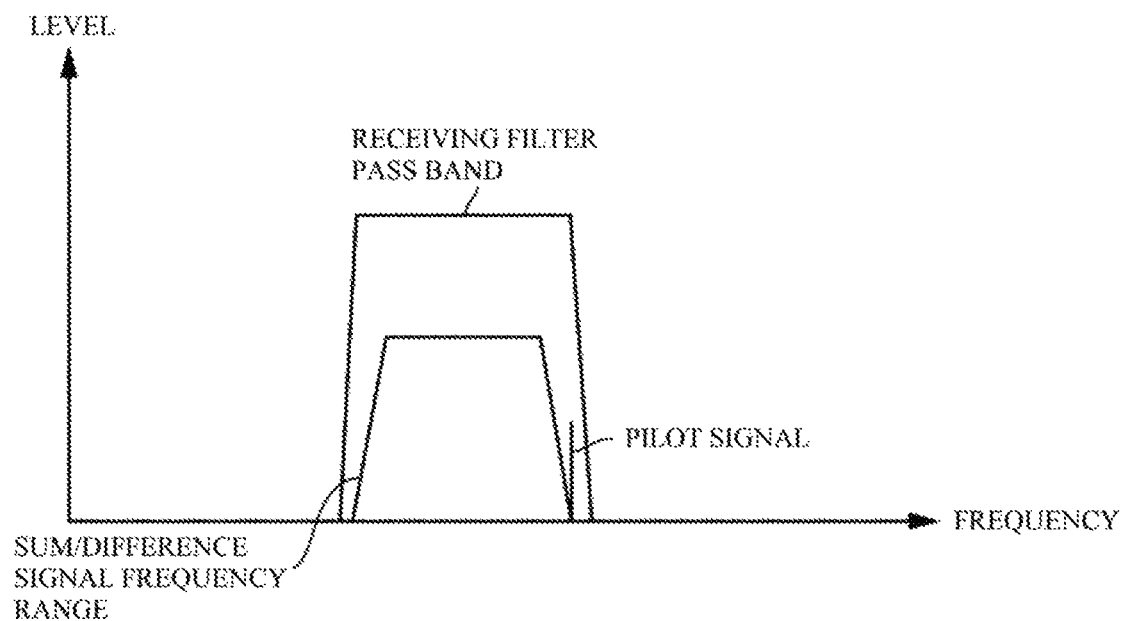
FIG. 6 is an explanatory drawing illustrating a relation between a frequency range of a sum signal and a difference signal and a frequency of a pilot signal.
Figure 7:
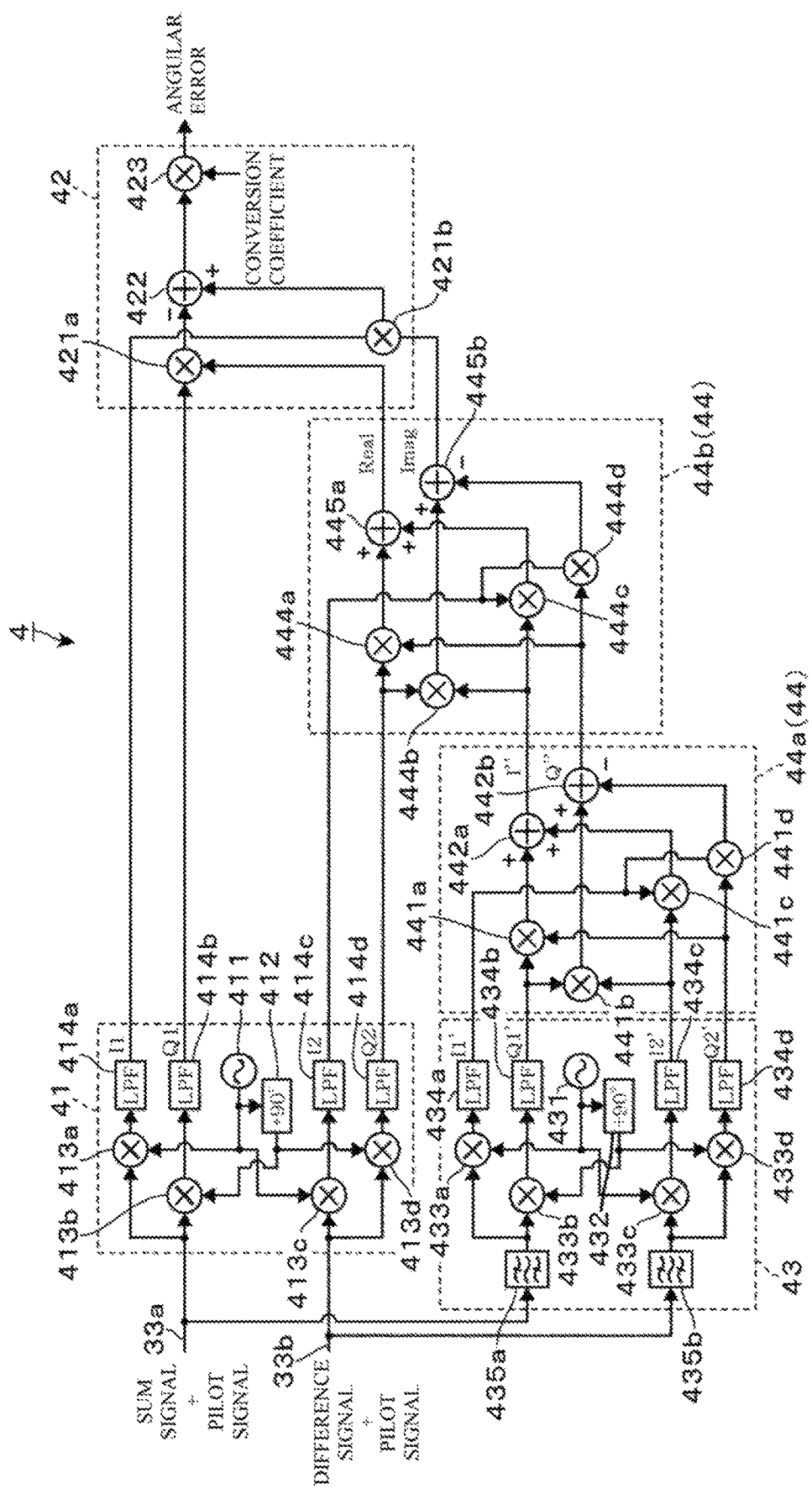
FIG. 7 is an explanatory drawing illustrating a configuration of a signal processing block in the angular error detecting device according to the embodiment.

The following describes a method for the detection and the correction of the phase difference using the pilot signal by referring to FIG. 5 to FIG. 8. In FIG. 5, FIG. 7, and FIG. 9 described below, components common to those described using FIG. 2 and FIG. 3 are given reference numerals common to those used in these drawings.

In the angular error detecting device 12 illustrated in FIG. 5, the reception signal output unit 3 includes a pilot signal oscillating unit 34 and addition units 35*a* and 35*b*. The pilot signal oscillating unit 34 supplies frequency signals as the pilot signals. The addition units 35*a* and 35*b* superimpose the pilot signals supplied from this pilot signal oscillating unit 34 on the sum signal and the difference signal before being output toward the sum-signal signal path 33*a* and the difference-signal signal path 33*b*.

The pilot signal oscillating unit 34 and the addition units 35*a* and 35*b* are equivalent to a pilot signal supply unit in this example.

As illustrated in FIG. 6, the pilot signal has a frequency within a pass band (described as "RECEIVING FILTER PASS BAND" in FIG. 6) of an analog filter (not illustrated) disposed in a stage preceding the sum/difference signal demodulating unit 41 and a pilot signal demodulating unit 43 and deviated from a frequency range (described as "SUM/DIFFERENCE SIGNAL FREQUENCY RANGE" in the identical drawing) of the sum signal or the difference signal obtained based on the communication signal having a frequency that varies in the above-described preliminarily set frequency range.

From the view point of removing the pilot signal using the LPFs 414*a* to 414*d* disposed in a stage following the sum/difference signal demodulating unit 41, the frequency of the pilot signal preferably has a frequency higher than the sum/difference signal frequency range.

The pilot signal has a signal level that is preferably reduced to a strength to the extent that does not cause deterioration in reception characteristics of the sum signal and the difference signal.

The sum signal and the difference signal on which the above-described pilot signals are superimposed are output to the sum-signal signal path 33*a* and the difference-signal signal path 33*b* respectively.

On the signal processing block 4 that obtains the sum signal and the difference signal on which the pilot signals are superimposed via the sum-signal signal path 33*a* and the difference-signal signal path 33*b*, in addition to the above-described sum/difference signal demodulating unit 41 and angular error detection unit 42, the pilot signal demodulating unit 43 and a phase difference detection/correction unit 44 are disposed.

The pilot signal demodulating unit 43 and the phase difference detection/correction unit 44 have a function that takes out the pilot signals superimposed on the sum signal and the difference signal, and then, detects and corrects the deviation in the phases caused by the passage through the sum-signal signal path 33*a* and the difference-signal signal path 33*b*.

Before a specific configuration (FIG. 7) of the pilot signal demodulating unit 43 and the phase difference detection/correction unit 44 will be described, a method to take out and correct the phase difference in the pilot signals using these pilot signal demodulating unit 43 and phase difference detection/correction unit 44 will be described by referring to FIG. 8.

Figure 8:
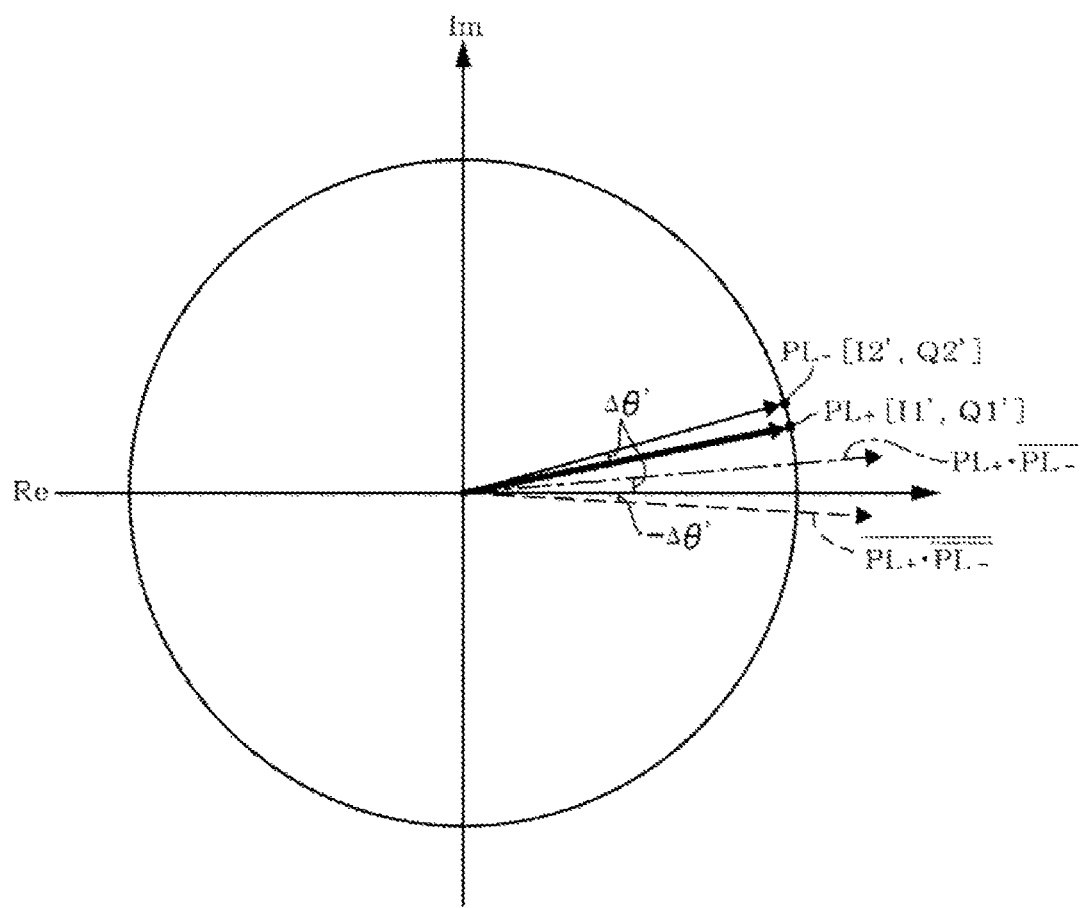
FIG. 8 is an explanatory drawing according to a method to correct an error caused by passage through a signal path.
Figure 9:
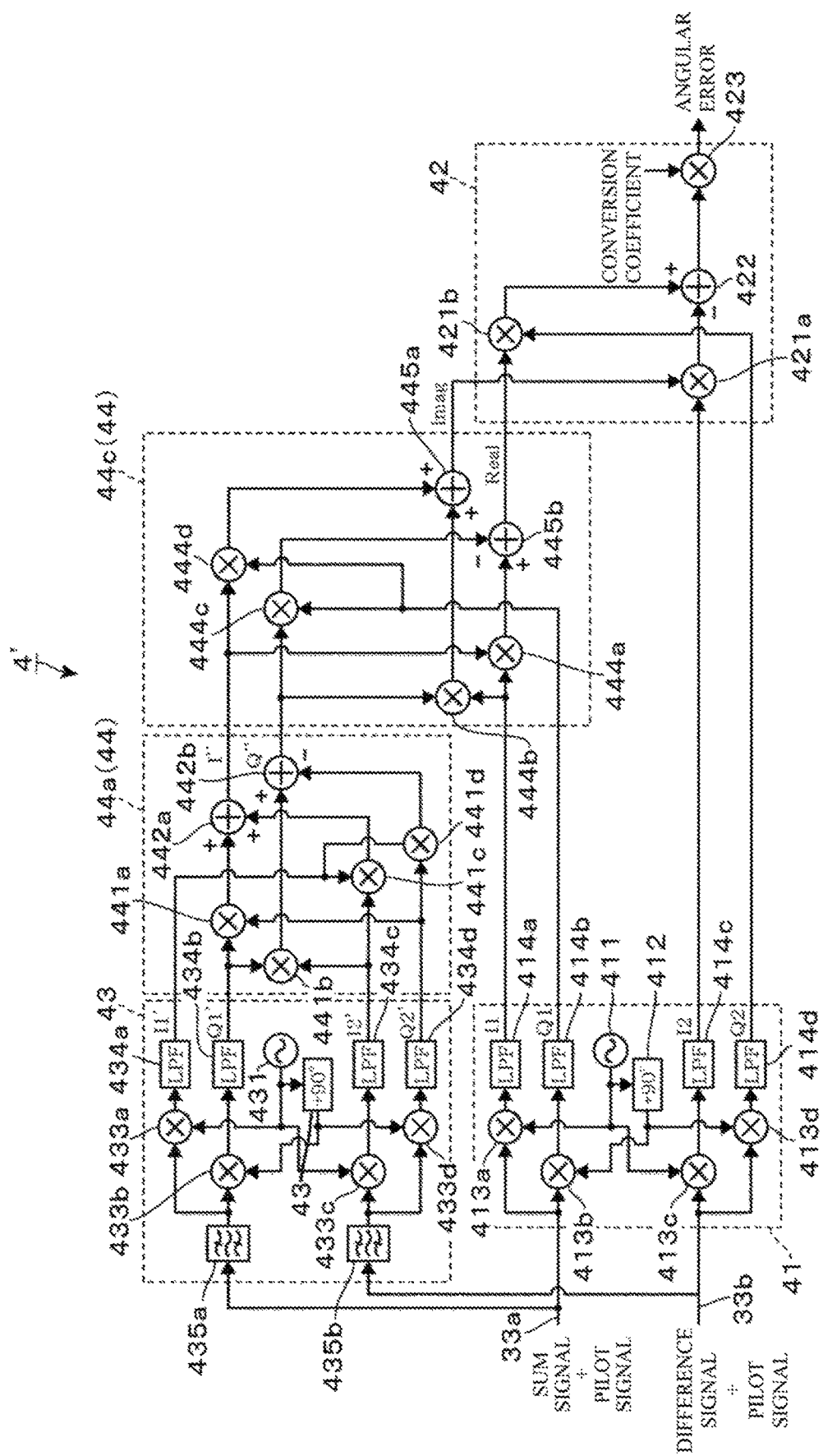
FIG. 9 is an explanatory drawing illustrating a configuration of a signal processing block in an angular error detecting device according to another embodiment.

A thick solid-line vector $PL_+$ in FIG. 8 indicates a result obtained such that, after the pilot signal that has been superimposed on the sum signal and has passed through the sum-signal signal path 33*a* is separated, the quadrature demodulation is performed on the separated pilot signal, and then, the complex vector representation is performed taking its In-phase component (I' component) as the real part and its Quadrature-phase component (Q' component) as the imaginary part on the complex plane. A thin solid-line vector $PL_-$ indicates a result obtained such that, after the pilot signal that has been superimposed on the difference signal and has passed through the difference-signal signal path 33*b* is separated, the quadrature demodulation is performed on the separated pilot signal, and then, the complex vector representation is similarly performed taking its I' component as the real part and its Q' component as the imaginary part.

A dash-dotted line in FIG. 8 is a complex vector (a pilot signal inner product vector) obtained by taking the inner product of the above-described two vectors $PL_+$ and $PL_-$ and expressed by the following Formula (3).

[Formula (3)]

$$PL_+ \cdot \overline{PL_-}$$

$$= (I1'+jQ1') \cdot (I2'-jQ2')$$

$$= (I1'I2'+Q1'Q2')+j(I2'Q1'-I1'Q2') \quad (3)$$

Furthermore, when the phase difference occurs between the two vectors $PL_+$ and $PL_-$ of the pilot signal, this phase difference is defined as $\Delta\theta'$.

At this time, an argument of a vector (expressed by the following Formula (4)) indicated by a dashed line in FIG. 8 and conjugated with the above-described pilot signal inner product vector is $-\Delta\theta'$ (Formula (5)).

[Formula (4)]

$$\overline{PL_+ \cdot PL_-} = I'' - jQ'' \text{ where } \begin{cases} I'' = I1'I2' + Q1'Q2' \\ Q'' = I2'Q1' - I1'Q2' \end{cases} \quad (4)$$

[Formula (5)]

$$\arg(\overline{PL_+ \cdot PL_-}) = -\Delta\theta' \quad (5)$$

Therefore, when the above-described phase difference is attempted to be decreased by correcting the difference signal side, the difference signal A−B is multiplied by the vector, which is expressed by the above-described Formula (4), conjugated with the pilot signal inner product vector. A vector obtained as a result of this calculation is proportionate to a difference signal (A−B)' having a phase aligned with that of the sum signal A+B side (Formula (6)).

[Formula (6)]

$$(A-B) \cdot (\overline{PL_+ \cdot PL_-})$$

$$= (I2+jQ2) \cdot (I''-jQ'')$$

$$= (I2I''+Q2Q'')+j(I''Q2-I2Q'') \propto (A-B)' \quad (6)$$

Then, the calculation described using FIGS. 3 and 4 is performed on this sum signal side and the vector in the Formula (6) to allow the exact angular error to be obtained using the sum signal A+B and the difference signal (A−B)' having the aligned phases.

FIG. 7 illustrates an exemplary specific configuration of the pilot signal demodulating unit 43 and the phase difference detection/correction unit 44 (a phase difference detection unit 44*a* and a difference signal correction unit 44*b*) that perform the above-described calculation.

The pilot signal demodulating unit 43 illustrated in FIG. 7 includes band-pass filters 435*a* and 435*b*, a frequency oscillating unit 431, and a phase rotator 432. The band-pass filters 435*a* and 435*b* take out the pilot signals from respective signals that have passed through the sum-signal signal path 33*a* and the difference-signal signal path 33*b*. The frequency oscillating unit 431 outputs a frequency signal (for example, sine wave) corresponding to the frequency of the carrier wave to these pilot signals. The phase rotator 432 obtains a frequency signal (for example, cosine wave) obtained such that a phase of the frequency signal corresponding to the frequency of the carrier wave is advanced by 90°.

A multiplier 433*a* multiplies the frequency signal from the frequency oscillating unit 431 by the pilot signal on the sum signal side separated via the band-pass filter 435*a*, thus taking out an I component (IF) by removing unnecessary components at an LPF 434*a*. A multiplier 433*b* multiplies the frequency signal having the phase advanced by 90° at the phase rotator 432 by the pilot signal on the sum signal side, thus taking out a Q component (Q1') by removing unnecessary components at an LPF 434*b*.

Similarly, a multiplier 433*c* multiplies the frequency signal from the frequency oscillating unit 431 by the pilot signal on the difference signal side separated via the band-pass filter 435*b*, thus taking out an I component (I2') by removing unnecessary components at an LPF 434*c*. A multiplier 433*d* multiplies the frequency signal having the phase advanced by 90° at the phase rotator 432 by the pilot signal on the difference signal side, thus taking out a Q component (Q2') by removing unnecessary components at an LPF 434*d*.

The phase difference detection unit 44*a* that constitutes the phase difference detection/correction unit 44 calculates the pilot signal inner product vector by calculating the Formula (3). The difference signal correction unit 44*b* calculates the Formula (6) that multiplies the vector conjugated with the pilot signal inner product vector by the difference signal.

Particularly, the phase difference detection unit 44*a* multiplies IF by I2' at a multiplier 441*c*, multiplies Q1' by Q2' at a multiplier 441*a*, and then, adds these multiplication results at an adder 442*a* to obtain a real part (I1'I2'+Q1'Q2'=I'') in the Formula (3). The phase difference detection unit 44*a* multiplies IF by Q2' at a multiplier 441*d*, multiplies I2' by Q1' at a multiplier 441*b*, and then, takes a difference in these multiplication results at an adder 442*b* to obtain an imaginary part (I1'Q2'−I2'Q1'=Q'') in the Formula (3).

Next, the difference signal correction unit 44*b* multiplies I2 on the difference signal side by I'' output from the phase difference detection unit 44*a* side at a multiplier 444*c*, multiplies Q2 on the difference signal side by Q″ on the phase difference detection unit 44*a* side at a multiplier 444*a*, and then, adds these multiplication results at an adder 445*a* to obtain a real part (I2I″+Q2Q″) in the Formula (6). The difference signal correction unit 44*b* multiplies I″ on the phase difference detection/correction unit 44 side by Q2 on the difference signal side at a multiplier 444*b*, multiplies I2 on the difference signal side by Q″ on the phase difference detection unit 44*a* side at a multiplier 444*d*, and then, takes a difference in these multiplication results at an adder 445*b* to obtain an imaginary part (I″Q2−I2Q″) in the Formula (6).

The Formula (1) is calculated at the angular error detection unit 42 using the calculation result (the values of the real part and the imaginary part) in the Formula (6) obtained at the phase difference detection/correction unit 44 to allow an angular error corrected by the deviation in the phases occurred in the sum-signal signal path 33*a* and the difference-signal signal path 33*b* to be obtained.

The angular error detecting device according to the embodiment has the following effect. The pilot signals are superimposed on the sum signal and the difference signal used for the angular error detection to be output to the signal paths (the sum-signal signal path 33*a* and the difference-signal signal path 33*b*), and then, the detection of the phase difference is performed by separating the pilot signals that have passed through these signal paths 33*a* and 33*b*. Thus, it is possible to know and correct the variation in the phases between the sum signal and the difference signal caused by the passage through the signal paths 33*a* and 33*b* in real time.

Here, a target on which the correction is performed using the phase difference Δθ' of the pilot signals that have passed through the sum-signal signal path 33*a* and the difference-signal signal path 33*b* is not limited to the difference signal side.

For example, instead of the above-described Formula (6), by performing a calculation corresponding to the following Formula (7), the correction on the sum signal side may be performed.

[Formula (7)]

$$(A-B)\cdot(PL_+\cdot\overline{PL_-})$$

$$=(I1+jQ1)\cdot(I''+jQ'')$$

$$=(I1I''+Q1Q'')+j(I''Q1+I1Q'') \quad (1)$$

FIG. 9 illustrates an exemplary specific configuration of a signal processing block 4' when the above-described calculation that performs the correction on the sum signal side is performed. Configurations of the sum/difference signal demodulating unit 41, the pilot signal demodulating unit 43, and the phase difference detection unit 44*a* illustrated in FIG. 9 are similar to those in the case of the signal processing block 4 described using FIG. 7.

On the other hand, a sum signal correction unit 44*c* multiplies I1 on the sum signal side by I″ output from the phase difference detection unit 44*a* side at the multiplier 444*a*, multiplies Q1 on the sum signal side by Q″ on the phase difference detection unit 44*a* side at the multiplier 444*c*, and then, performs subtraction on these multiplication results at the adder 445*b* to obtain a real part (I1I″−Q1Q″) in the Formula (7). The sum signal correction unit 44*c* multiplies I″ on the phase difference detection/correction unit 44 side by Q1 on the sum signal side at the multiplier 444*d*, multiplies I1 on the sum signal side by Q″ on the phase difference detection unit 44*a* side at the multiplier 444*b*, and then, adds these multiplication results at the adder 445*a* to obtain an imaginary part (I″Q1+I1Q″) in the Formula (7).

Then, also in FIG. 9, the Formula (1) is calculated at the angular error detection unit 42 using the calculation result (the values of the real part and the imaginary part) in the Formula (7) obtained at the phase difference detection/correction unit 44 (the phase difference detection unit 44*a* and the sum signal correction unit 44*c*) to allow an angular error corrected by the deviation in the phases occurred in the sum-signal signal path 33*a* and the difference-signal signal path 33*b* to be obtained.

While the above described the method to detect the accurate angular error using the result of the quadrature demodulation of the sum signal, the difference signal, and the pilot signals that have passed through the sum-signal signal path 33*a* and the difference-signal signal path 33*b*, this method is not limited to the above-described embodiment.

For example, phase comparison of the respective pilot signals that have passed through the sum-signal signal path 33*a* and the difference-signal signal path 33*b* may be performed using a phase comparator to obtain its phase difference, thus correcting any one of a sum signal A+B=/and a difference signal A−B. After that, the phase of the difference signal A−B=A may be rotated by 90° (multiplied by −j), thus obtaining the angular error using a known technique that uses the fact that −jΔ/Σ is a value approximately proportionate to the angular error Δθ.

An applicable object of the angular error detecting device of this disclosure is not limited to the tracking receiving system for communication. For example, the angular error detecting device of this disclosure may be disposed in a radar system. In this case, the tracking target is a detection object, and the frequency signal from the tracking target is a signal reflected such that the detection object is irradiated with the frequency signal.

The angular error detecting device according to the above-described aspect of this disclosure may include the following configurations.

(a) The signal from the tracking target is a signal modulated by a carrier wave. The angular error detecting device includes a sum/difference signal demodulating unit that performs a quadrature demodulation on the sum signal and the difference signal that are obtained via the sum-signal signal path and the difference-signal signal path and obtains respective In-phase components (I components) and Quadrature-phase components (Q components) of the sum signal and the difference signal. The phase difference detection unit detects the angular error based on a value of an imaginary part of a sum/difference signal inner product vector obtained by taking an inner product of the difference signal and the sum signal that are represented as complex vectors taking the I component as a real part and the Q component as the imaginary part on a complex plane.

(b) In (a), the angular error detecting device includes a pilot signal demodulating unit that performs a quadrature demodulation on the separated pilot signal and obtains respective In-phase component (I' component) and Quadrature-phase component (Q' component) of the pilot signal that has passed through the sum-signal signal path or the difference-signal signal path. The correction unit corrects one side of the sum signal and the difference signal based on a pilot signal inner product vector obtained by taking an inner product of the pilot signal that has passed through the sum-signal signal path and the pilot signal that has passed through the difference-signal signal path that are represented as complex vectors taking the I' component as a real part and the Q' component as an imaginary part on a complex plane. Here, the correction unit multiplies a conjugate vector conjugated with the pilot signal inner product vector by the difference signal represented as the complex vector to correct the difference signal. The correction unit multiplies the pilot signal inner product vector by the sum signal represented as the complex vector to correct the sum signal.

(c) The frequency signal from the tracking target has a frequency that varies in a preliminarily set frequency range. The pilot signal has a frequency in a pass band of a band-pass filter that removes an unnecessary frequency component other than the sum signal or the difference signal, and the frequency is deviated from a frequency range of the sum signal or the difference signal obtained based on a frequency signal in the frequency range.

According to this embodiment, the pilot signals are superimposed on the sum signal and the difference signal used for the angular error detection to be output to the signal paths (the sum-signal signal path and the difference-signal signal path), and then, the detection of the phase difference is performed by separating the pilot signals that have passed through these signal paths. Thus, it is possible to know and correct the variation in the phases between the sum signal and the difference signal caused by the passage through the signal paths in real time.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An angular error detecting device that detects an angular error in a receiving direction of a frequency signal from a tracking target with respect to a front direction of an antenna, based on a phase difference of a first reception signal received at a first receiving unit of the antenna and a second reception signal received at a second receiving unit having a receiving position in the antenna different from a receiving position of the first receiving unit, and the angular error detecting device comprising:

a reception signal output unit that outputs a sum signal and a difference signal that are obtained from the first reception signal and the second reception signal to a sum-signal signal path and a difference-signal signal path respectively;

a pilot signal supply unit that superimposes respective pilot signals having aligned phases on the sum signal and the difference signal that are output to the sum-signal signal path and the difference-signal signal path;

a pilot phase difference detection unit that separates the respective pilot signals from a signal that has passed through the sum-signal signal path and a signal that has passed through the difference-signal signal path and detects a phase difference in the separated pilot signals;

a correction unit that performs a correction corresponding to the phase difference in the pilot signals detected at the pilot phase difference detection unit on one side of the sum signal and the difference signal that are obtained via the sum-signal signal path and the difference-signal signal path; and an angular error detection unit that detects the angular error based on the one side corrected at the correction unit and the other side that is not corrected of the sum signal and the difference signal.

2. The angular error detecting device according to claim 1, wherein the signal from the tracking target is a signal modulated by a carrier wave, the angular error detecting device further comprises: a sum/difference signal demodulating unit that performs a quadrature demodulation on the sum signal and the difference signal that are obtained via the sum-signal signal path and the difference-signal signal path and obtains respective In-phase components that are I components and Quadrature-phase components that are Q components of the sum signal and the difference signal, and the phase difference detection unit detects the angular error based on a value of an imaginary part of a sum/difference signal inner product vector obtained by taking an inner product of the difference signal and the sum signal that are represented as complex vectors taking the I component as a real part and the Q component as the imaginary part on a complex plane.

3. The angular error detecting device according to claim 2, further comprising:

a pilot signal demodulating unit that performs a quadrature demodulation on the separated pilot signal and obtains respective In-phase component that is I' component and Quadrature-phase component that is Q' component of the pilot signal that has passed through the sum-signal signal path or the difference-signal signal path, wherein the correction unit corrects one side of the sum signal and the difference signal based on a pilot signal inner product vector obtained by taking an inner product of the pilot signal that has passed through the sum-signal signal path and the pilot signal that has passed through the difference-signal signal path that are represented as complex vectors taking the I' component as a real part and the Q' component as an imaginary part on a complex plane.

4. The angular error detecting device according to claim 3, wherein the correction unit multiplies a conjugate vector conjugated with the pilot signal inner product vector by the difference signal represented as the complex vector to correct the difference signal.

5. The angular error detecting device according to claim 3, wherein the correction unit multiplies the pilot signal inner product vector by the sum signal represented as the complex vector to correct the sum signal.

6. The angular error detecting device according to claim 1, wherein the frequency signal from the tracking target has a frequency that varies in a preliminarily set frequency range, and the pilot signal has a frequency in a pass band of a band-pass filter that removes an unnecessary frequency component other than the sum signal or the difference signal, and the frequency is deviated from a frequency range of the sum signal or the difference signal obtained based on a frequency signal in the frequency range.

\* \* \* \* \*